Dec. 29, 1964  W. S. WHEELER  3,162,989
COTTON PICKER DRIVING APPARATUS
Filed March 20, 1963  2 Sheets-Sheet 1
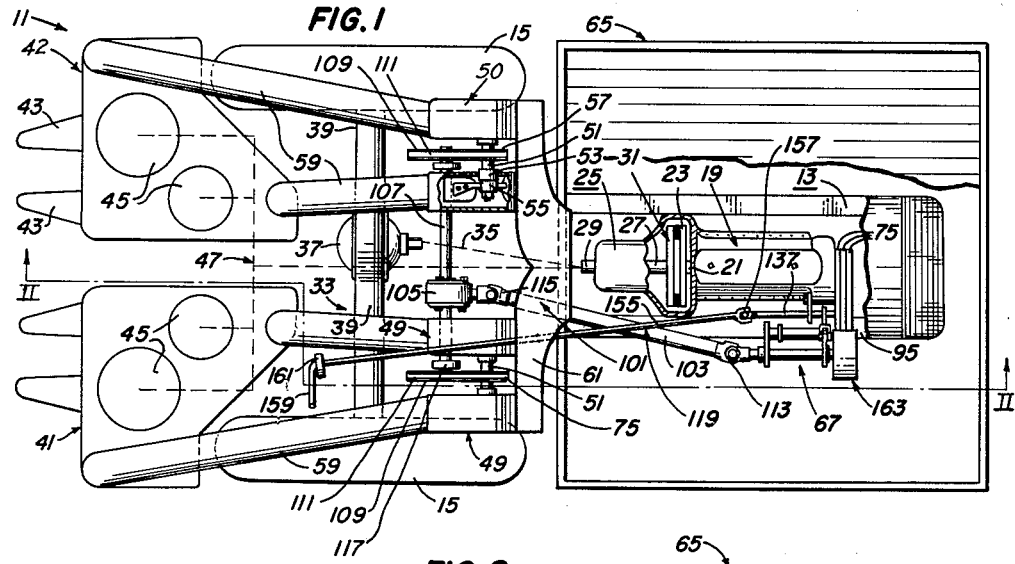
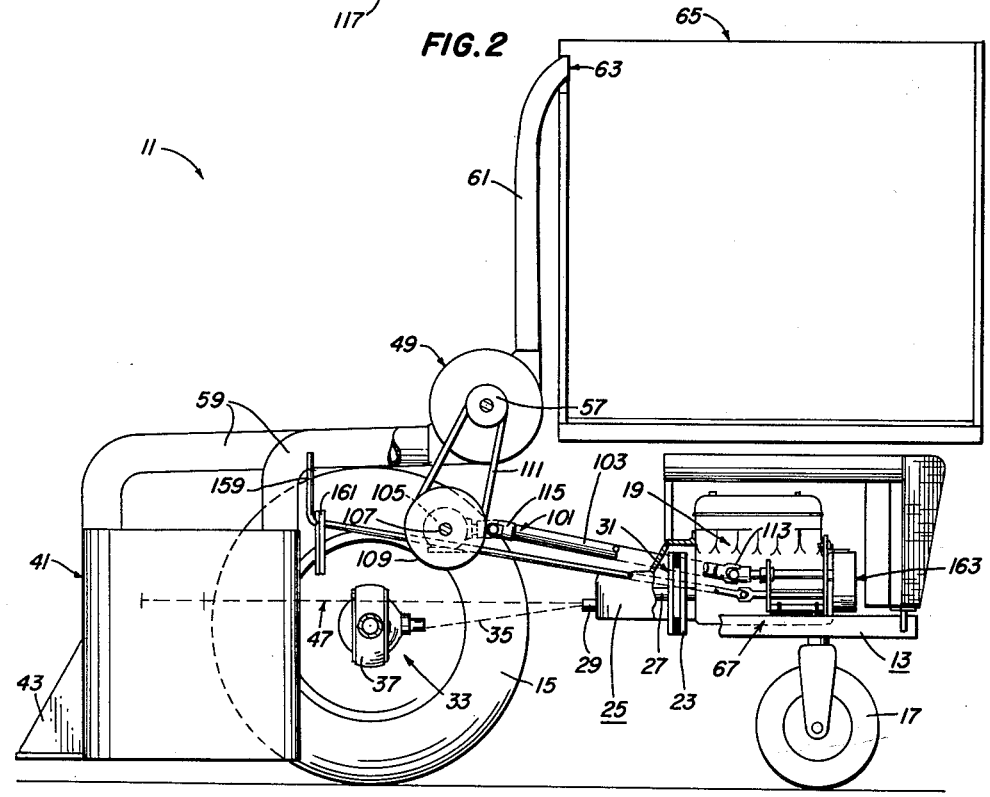
INVENTOR.
WILBUR S. WHEELER
BY John R. Walker, III
Attorney Dec. 29, 1964

W. S. WHEELER 3,162,989

COTTON PICKER DRIVING APPARATUS

Filed March 20, 1963

INVENTOR.
WILBUR S. WHEELER
BY John R. Walker, III
Attorney

United States Patent Office 3,162,989
Patented Dec. 29, 1964

3,162,989
COTTON PICKER DRIVING APPARATUS
Wilbur S. Wheeler, Rte. 1, Essex, Mo.
Filed Mar. 20, 1963, Ser. No. 266,625
6 Claims. (Cl. 56—14)

This invention relates to the driving apparatus in a cotton picking machine or picker, and to means whereby the overall performance and effectiveness of the picker is improved.

The conventional cotton picker usually has three principal drives or drive trains, which transmit movement from a single engine to three principal components of the machine, i.e., the wheels, the spindles, and the fan. The wheel drive transmits power from the engine to the wheels for the travel of the machine over the ground or along the rows of cotton plants. The spindle drive rotates the cotton picking spindles in the picking unit to pluck the cotton from the cotton plants. The fan drive turns the multi-bladed fan or fans to convey the plucked cotton from the picking units to the cotton receptacle or basket.

Heretofore, when the picker was operating in the field, the three drives were in interlocked engagement, and although they could be disengaged from the engine by releasing a conventional clutch at the engine fly wheel, they could not be readily disengaged one from the other; that is, the separate drive trains could not be independently disengaged while the connected trains were under load or working. The three drives being thus connected caused several problems, such as: When operating in the field, particularly if the ground were wet and the basket loaded with cotton, it was sometimes hard to start the three drives at the same time without causing considerable strain on the various drive trains in the picker. A further problem in operating previous pickers in the field occurred when it was necessary to quickly stop the forward travel of the picker, as is often done to keep a loosened root or chunk from entering the picking units and thus causing extensive damage to the machine. It has heretofore been difficult, and often impossible, to stop the machine in time to avoid such damage. This was caused by the inertial rotation of the various parts of the picker, particularly the blades of the conveyor fan which turned at high speed and were geared so that the momentum of the blades would continue to move the picker forward after the engine clutch was released and the brakes applied. Another problem occurring in the operation of previous pickers was that often it was necessary to clear brush or cotton from the cotton picking unit. The usual procedure in order to clear brush or cotton from the picking unit was to disengage the clutch, take the spindle and drive wheels out of gear at the transmission, and with the fan turning at high speed the operator would dismount from the picker and clear the header. After this was done and the operator had mounted the picker again, it was necessary to disengage the clutch, wait a considerably long time for the fan to coast to a stop, put the three drives in engagement, and then continue picking cotton. This, of course, was troublesome and resulted in much lost time from picking the cotton. Also with previous pickers the transmissions thereof were susceptible to being worn out in a relatively short time due to the fact that the transmissions were under considerable strain by having to carry the combined load of the wheels, the spindles, and the fans. The above mentioned problems relative to the driving arrangement previously used in cotton pickers resulted in increased operating costs as a result of excessive wear to the various drive parts and of time lost while operating the picker in the field.

The present invention does much to overcome the above mentioned problems and has as a primary object to provide, in the driving apparatus in a cotton picker, means whereby power from a single engine can be effectively distributed to the three main components of the machine.

A further object is to relieve the transmission of the power taken by the fans so as to alleviate overloading of the transmission and thereby make possible a long life thereof.

A further object is to provide, in the driving apparatus in a cotton picker, means whereby the picker can be started from a standstill to pick a row of cotton without placing undue strain on the driving apparatus.

A further object is to provide, in the driving apparatus of a cotton picker, means for driving the conveyor fan directly from the engine and separately from the wheel and spindle drives.

A further object is to provide, in the driving apparatus of a cotton picker, means whereby the picking units of the machine can be cleared quickly of plugged cotton or foreign matter.

A further object is generally to improve the design and construction of the driving apparatus in a cotton picker.

The means by which the foregoing and other objects of the present invention are accomplished and the manner of their accomplishment will be readily understood from the following specification upon reference to the accompanying drawings, in which:

FIG. 1 is a top plan view of a two-row cotton picking machine, with parts broken away and removed for purposes of clarity, and showing somewhat diagrammatically the drive paths for the wheel and spindle drives and showing in greater detail the cotton conveyor fan drive.

FIG. 2 is a sectional view of the cotton picker as taken on the line II—II of FIG. 1.

Figure 3:
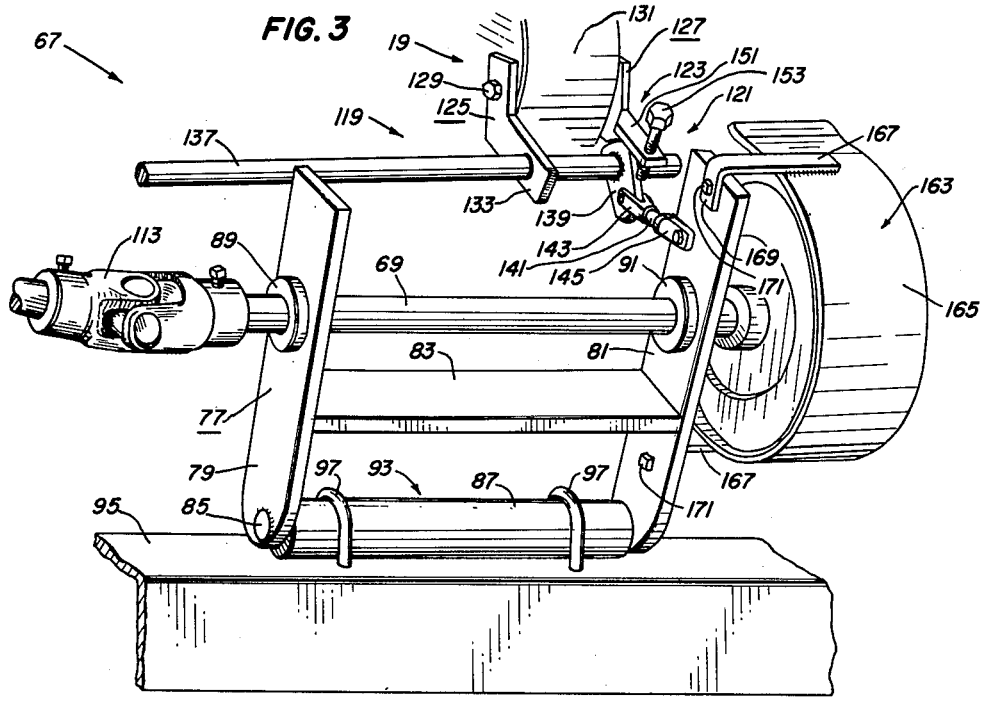
FIG. 3 is an enlarged perspective view of the power take-off mechanism of the conveyor fan drive.

Referring now to the drawings in which the various parts are indicated by numerals, and referring first to FIGS. 1 and 2, a cotton picker 11 is illustrated, which includes a structural framework 13, a pair of driving wheels 15 forwardly disposed and mounted from framework 13 (forward being to the left as viewed in FIGS. 1, 2 and 3), and a guiding wheel 17 rearwardly and centrally disposed of drive wheels 15 and mounted from framework 13. An engine 19 is mounted on framework 13 rearwardly of drive wheels 15 and upwardly from guiding wheel 17. Engine 19 includes a crankshaft 21 and the usual fly wheel 23 fixedly attached to one end thereof. A geared transmission 25 is disposed forwardly of engine 19 and is fixedly attached thereto. Transmission 25 includes an input shaft 27, an output shaft 29, and means manually selectable for changing the ratio of the speeds of the input and output shafts. A friction clutch 31 is conventionally mounted between engine 19 and transmission 25 disengageably coupling fly wheel 23 with input shaft 27.

A driving means, herein designated first drive train 33, transmits movement from the output shaft 29 to drive wheels 15 for propelling the picker over the ground. First drive train 33 includes that portion indicated diagrammatically at 35, a power divider or differential 37, and a pair of final drive mechanisms 39 extending outwardly from differential 37 to each of drive wheels 15. Portion 35 of drive train 33, although not shown mechanically in detail, is of usual construction and includes mechanical means well known to those skilled in the art. Engine 19 thus transmits power through clutch 31, transmission 25, and first drive train 33 to turn drive wheels 15 and propel picker 11 over the ground.

Mounted forwardly and somewhat inwardly of drive wheels 15 is a pair of cotton picking units 41, 42. Each unit of the pair picks cotton from a row of cotton plants which pass between dividers 43. Each picking unit 41, 42 includes a pair of rotors 45 from which are radially disposed the picking spindles, not shown, for plucking the cotton from the cotton plants.

A second drive train 47 interconnectingly transmits movement from output shaft 29 to rotors 45 of picking units 41, 42. As in portion 35 of first drive train 33, second drive train 47 is shown diagrammatically and also is of usual construction and includes mechanical means well known to those skilled in the art. Engine 19 thus transmits power to rotors 45 of cotton picking units 41, 42 through friction clutch 31, transmission 25, and second drive train 47. Referring to FIGS. 1 and 2, it will be noted that the first and second drive trains, 33, 47, respectively, are both connected and are driven from output shaft 29. Connecting and locking these two drive trains together is in accordance with the usual practice and is necessary for the effective operation of the picker. It is also the usual practice to connect these drives to output shaft 29 of transmission 25 whereby the selectable speed of the output shaft can regulate the picking speed of the picker.

Cotton conveying means, as seen in FIGS. 1 and 2, includes conveyor fans 49, 50 which are disposed in two pairs, with one pair to each row of cotton plants and one pair to each cotton picking unit. Each pair of fans 49, 50 is provided with a shaft 51 which is rotatably mounted in bearings 53. A multi-bladed impeller 55 is fixedly attached to each end of shaft 51, and a pulley 57 is intermediately mounted thereon. An inlet pipe 59 is provided on the suction side of each of fans 49, 50 through which the cotton is elevated from a respective one of rotors 45 to a respective one of fans 49, 50. A relatively flat bifurcated conduit 61 is provided on the outlet or exhaust side of fans 49, 50 and funnels the cotton from each of fans 49, 50 upwardly and through an opening 63 in conduit 61 and into a basket or receptacle 65 mounted rearwardly on picker 11 and carried thereby.

In the drive of the cotton conveyer means and for fans 49, 50 thereof, a power take-off mechanism 67 is provided, as best seen in FIG. 3. Power take-off mechanism 67, in the preferred form, includes a countershaft 69 disposed laterally of engine 19 and parallel with crankshaft 21. A first pulley 71 is fixedly attached to crankshaft 21 at the end opposite fly wheel 23, at best seen in FIG. 4. A second pulley 73 is fixedly attached to countershaft 69. Pulleys 71, 73 and belts 75 are preferably of the V-type construction with each of pulleys 71, 73 being preferably provided with three grooves receiving three of the belts 75.

Figure 4:
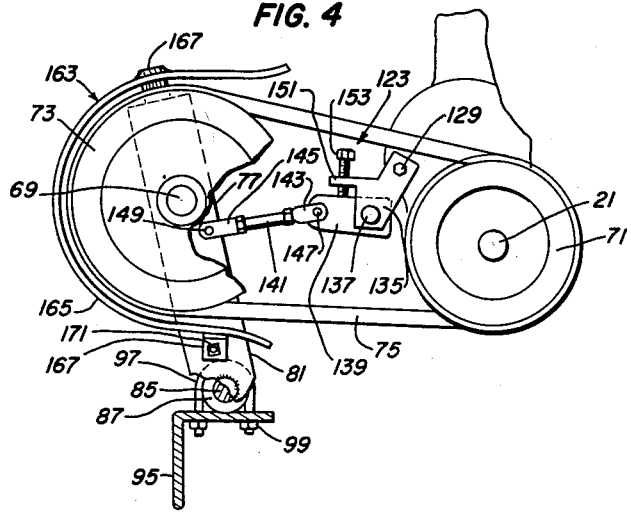
FIG. 4 is another view of the conveyor fan drive, reduced somewhat, and with fragments of the parts removed for purposes of clarity and seen as viewed from the right of FIG. 3.

A countershaft frame 77 is provided and includes two upstanding members 79, 81 and two horizontal members 83, 85. Upstanding members 79, 81 and horizontal member 83 are substantially of the same stock material and are of similar cross section. Horizontal member 85 is cylindrical and extends between members 79, 81 at the lower end of each thereof. A tubular sleeve 87 is fitted over horizontal member 85. Frame 77 is preferably rigidly assembled as by welding. It should be noted that in assembling frame 77, tubular sleeve 87 is fitted over member 85 before joining upstanding members 83, 85. Sleeve 87 is a free fit on member 85 and is slightly less in length than the distance between upstanding members 79, 81. The upper ends of members 79, 81 are provided with openings, and bearings 89, 91 are secured therein. Bearings 89, 91 are preferably of the ball-bearing self-aligning type having an outer race and an inner race. Countershaft 69 is rotatably mounted in bearings 89, 91 with the inner races of the bearings being fixed to the shaft. A pivotal mounting 93 pivotally mounts frame 77 on supporting member 95 which is rigidly connected to engine 19 and forms a part of framework 13. Frame 77 is pivotally fastened on support member 95 by U-bolts 97, the ends of which extend downwardly around sleeve 87 and are secured by nuts 99, as seen in FIG. 4.

A third drive train 101 interconnects power take-off 67 to fans 49, as best seen in FIGS. 1 and 2. Third drive train 101 is of generally known drive construction and includes a first shaft 103, a right angle geared transmission 105, a second shaft 107, a pair of pulleys 109, and a pair of belts 111. Drive train 101 additionally includes universal joints 113, 115 provided on each end of shaft 103 and respectively coupled to countershaft 69 and transmission 105. Shaft 107 extends through transmission 105, and pulleys 109 are fixedly attached adjacent the ends thereof. A pair of bearings 117 are disposed inwardly of pulleys 109 and rotatably mount shaft 107 from framework 13. Each of belts 111 connectingly extends around a respective larger pulley 109 on shaft 107 and a smaller pulley 57 fixed to fan shaft 51.

A control mechanism 119, as best seen in FIG. 3, is provided for manually effecting the outward and inward movement of countershaft 69 to respectively tighten and loosen belts 75. Control mechanism 119 preferably comprises a toggle joint mechanism 121 and also includes an over center travel limiting means 123. Control mechanism 119 includes L-shaped brackets 125, 127 fixedly attached by bolts 129 to opposite sides of the cam shaft gear housing 131 of engine 19, as best shown in FIGS. 2 and 3. The outwardly extending leg portions 133, 135 of brackets 125, 127 are provided with bore openings which are aligned axially and serve as being surfaces for control rod 137.

Toggle joint mechanism 121 includes an arm 139 fixedly attached at one end thereof to rod 137 as by welding. Arm 139 is disposed between brackets 125, 127 and is attached to rod 137 forwardly of and adjacent to bracket 127. A connecting link 141 is provided and includes a pair of turnbuckles 143, 135 adjustably attached at each end thereof. Pin 147 of turnbuckle 143 extends through a bore opening provided in the distal end of arm 139, and a like pin 149 of turnbuckle 145 extends through a bore opening provided in member 81 of frame 77.

The travel limiting drive 123, as best seen in FIG. 4, serves as a stop for the rotational movement of arm 139 and includes a flange 151 integrally formed of leg portion 135 of bracket 127 and includes a screw 153 threadedly attached to bracket 127, which screw adjustably extends through a threaded bore opening provided therefor in flange 151.

An extension rod 155, as seen in FIGS. 1 and 2, is connected at the rearward end thereof to control rod 137 by a universal joint 157. Rod 155 extends forwardly and upwardly from universal joint 157 and is provided at the terminal portion thereof with a handle 159. Handle 159 is integrally formed from an outturned portion of rod 155 and is in such a position as to be easily reached by the operator of the picker. A support member 161, secured to framework 13, is provided and includes a bore opening through which extension rod 155 is pivotally mounted to framework 13.

A belt guide member 163, as best seen in FIGS. 3 and 4, is provided to keep belts 75 in proper alignment as they are loosened and as they are disengaged from pulleys 71, 73. Guide member 163 includes a semi-circularly formed retainer piece 165 having a pair of angular brackets 167 attached as by welding to the opposite sides thereof. Brackets 167 extend from the forward edge of retainer piece 165 and include downturned portions 169. Bore openings are provided in portions 169 and correspondingly spaced openings are provided in member 81 through which fasteners 171 attach guide member 163 to frame 77.

In the adjustment of control mechanism 119, two factors should be considered—the tension of belts 75 around pulleys 71, 73 as they are in engaged relationship, and the distance past center of arm 139 as it abuts the distal end of adjustment screw 153. Both these adjustments are relative one to the other, and both co-actingly effect the operation of the power take-off mechanism 67. Referring to FIG. 4 which shows mechanism 67 in the engaged position, it is readily seen that the adjustment of the tension on belts 75 is regulated by the manipulation of the link 141 and turnbuckles 143, 145 of toggle joint mechanism 121, and, thus, by regulating the distance between pins 149 and 147, the belts 75 are tightened or loosened. It is readily seen that turning adjustment screw 153 in or out, and thus pivotally moving arm 139, also effects the tension of belts 75 and is the over center adjustment therefor. It should be understood that over center adjustment has reference to the disposition of pin 147 past an imaginary line between pin 149 and rod 137, that is, the distance upward from this line to the center of pin 147 is the distance past the center of toggle joint 121 in an engaged position. This over center adjustment, in addition to regulating the tension of belts 75, also regulates the amount of effort required by the operator of the picker to engage or disengage mechanism 67 by handle 159. The movement of pin 147 upward or downward past the center line between rod 137 and pin 149 respectively tightens or loosens belts 75 and thus engages or disengages mechanism 67.

The preferred procedure in operating the picker in the field is as follows: With transmission 25 and first and second drives 33, 47 disengaged and engine 19 running approximately at half throttle, the third drive 101, and thus the conveyor fan drive, is engaged by pulling up on handle 159, thereby engaging mechanism 67 and causing fans 49 to rotate. The throttle of engine 19 is opened somewhat, and with the fans turning, the friction clutch 31 is disengaged and transmission 25 put in a selected gear. Clutch 31 is then released, thus causing the simultaneous movement of first and second drive trains 33, 47 and the forward travel of picker 11 with the spindles of rotors 45 turning.

From the above it is readily seen that should the picker 11 be on soft ground, the momentum of the multi-bladed propeller 55 of fans 49 and the associated fan drive parts would act to cause an additional impetus to the picker at the time it is most needed.

In picking cotton, should it be necessary to stop the forward travel of the picker, the operator has only to release clutch 31, thus disengaging the spindle and wheel drives, and causing the picker to stop while the fans continue to turn. This results in the operator being able to stop the picker quickly, thereby to lessen the likelihood of picking up loosened roots and thus damaging the machine.

When it is necessary to remove the plugged cotton or foreign material from the cotton picking unit, the operator disengages clutch 31, thus disengaging the spindle and wheel drives, and then, with the conveyor fan drive running, he can readily clear the machine. After the machine is cleared, the operator has only to expeditiously put the transmission in gear, release clutch 31, and continue picking cotton.

From the foregoing it will be readily seen that the present invention provides, in the driving apparatus of a cotton picker, improved driving means whereby the overall effectiveness of the machine is improved, and such drive means which results in economical operation in the field and substantial savings in repair and maintenance of the machine. Thus, in the present invention, only the wheel drive and spindle drive are through the transmission 25, and the fans 49 are no longer driven through this transmission as was previously the case. This results in long life of the transmission 25.

Although the present invention has been described and illustrated with respect to a preferred embodiment thereof, it is to be understood that it is not to be so limited since changes and modifications may be made therein which are within the full intended scope of this invention as hereinafter claimed.

I claim:

1. In the driving apparatus of a cotton picker, an engine having a crankshaft and including a fly wheel fixedly attached to one end of said crankshaft, a transmission having an input shaft and an output shaft and including means manually selectable for changing the ratio of the speeds of said input and output shafts, a friction clutch mounted between said engine and said transmission disengagingly coupling said fly wheel and said input shaft, two ground engaging wheels, a first drive train including means interconnecting said wheels and said output shaft for traveling movement of the cotton picker along the ground, a cotton picking unit for removing the cotton from the cotton plants, a second drive train interconnecting said cotton picking unit and said output shaft for the operation of said cotton picking unit, at least one fan and conduit means for conveying the cotton from said cotton picking unit to a remote place therefrom, a countershaft disposed laterally of said engine and parallel with said crankshaft thereof, a first pulley fixedly attached to said crankshaft at the end opposite from said fly wheel, a second pulley fixedly attached to said countershaft, belt means around said first and second pulleys, a frame, bearing means mounted on said frame rotatably receiving said countershaft, support means rigidly connected to said engine, means pivotally mounting said frame on said support means for movement of said countershaft outwardly and inwardly relative to said crankshaft to respectively tighten and loosen said belt means around said first and second pulleys, a third drive train interconnecting said fan and said countershaft, and control means for manually effecting said outward and inward movement of said countershaft for engagement and disengagement of said fan with said engine.

2. The driving apparatus as defined in claim 1 in which is included a belt means guide member comprising a semicircular retainer piece having oppositely disposed outward side surface portions and a forwardly disposed edge, a pair of angular brackets disposed forwardly from said forward edge of said retainer piece and fixedly attached to the opposite outward side surface portions thereof, fastening means fixedly securing said pair of brackets to said frame and fixedly mounting said retainer piece thereto, said retainer piece of said belt guide member being concentrically mounted in fixed adjacency to said second pulley and pivotally movable with said frame.

3. The driving apparatus as defined in claim 1 in which said first pulley and said second pulley include a plurality of V-type grooves in the circumferential periphery of each thereof and said belt means comprises a like plurality of V-type belts co-acting with said grooves of said first and second pulleys.

4. In the driving apparatus of a cotton picker, an engine having a crankshaft and including a fly wheel fixedly attached to one end of said crankshaft, a transmission having an input shaft and an output shaft and including means manually selectable for changing the ratio of the speeds of said input and output shafts, a friction clutch mounted between said engine and said transmission disengagingly coupling said fly wheel and said input shaft, two ground engaging wheels, a first drive train including means interconnecting said wheels and said output shaft for traveling movement of the cotton picker along the ground, a cotton picking unit for removing the cotton from the cotton plants, a second drive train interconnecting said cotton picking unit and said output shaft for the operation of said cotton picking unit, at least one fan and conduit means for conveying the cotton from said cotton picking unit to a remote place therefrom, a countershaft disposed laterally of said engine and parallel with said crankshaft thereof, a first pulley fixedly attached to said crankshaft at the end opposite from said fly wheel, a second pulley fixedly attached to said countershaft, belt means around said first and second pulleys, a frame including a first and a second upright member having a bore opening in the upper end of each and at least one horizontal member rigidly interconnecting said first and second upright members, bearing means mounted in said bore openings and rotatably receiving said countershaft, support means rigidly connected to said engine, pivotal mounting means pivotally mounting said frame on said support means for movement of said countershaft outwardly and inwardly relative to said crankshaft to respectively tighten and loosen said belt means around said first and second pulleys, said pivotal mounting means including a sleeve turnably fitted on said horizontal member and means fixedly fastening said sleeve to said support means, a third drive train interconnecting said fan and said countershaft, and control means for manually effecting the outward and inward movement of said countershaft for the engagement and disengagement of said fan with said engine.

5. The driving apparatus as defined in claim 4 in which said control means comprises bracket means rigidly mounted from said engine and having at least one opening provided therein, a control rod journaled in said opening and turnably mounted on said bracket means, an elongated arm having one end fixedly and perpendicularly attached to said control rod and the other and distal end outwardly disposed therefrom, adjustable link means adjustably connecting said arm at said other end to said frame, and extension means connected to said control rod for remotely actuating said adjustable link means and moving said frame inward and outward from said engine; said control means also including an over-center travel limiting means comprising a flanged portion integrally formed of said bracket means and disposed adjacent said elongated arm with said flanged portion having a threaded bore opening therein and an adjustment screw threadedly engaged in said bore opening, said adjustment screw having the end of the shank portion thereof abuttingly engaging said elongated arm for adjustably limiting the rotational movement of said control arm and regulating the over-center travel of said connecting link.

6. The driving apparatus as defined in claim 5 in which said extension means comprises an extension rod, a universal joint interconnecting one end of said extension rod to said control rod, a handle integrally formed of an outturned portion of said control rod at the other end thereof, and a support member pivotally supporting said extension rod adjacent said handle.

References Cited by the Examiner
UNITED STATES PATENTS

| | | | |
|---|---|---|---|
| 2,518,465 | 8/50 | Hagen et al. | 56—12 |
| 2,680,946 | 6/54 | Rousey | 56—25 |

T. GRAHAM CRAVER, *Primary Examiner.*

RUSSELL R. KINSEY, *Examiner.*